Figure 1:
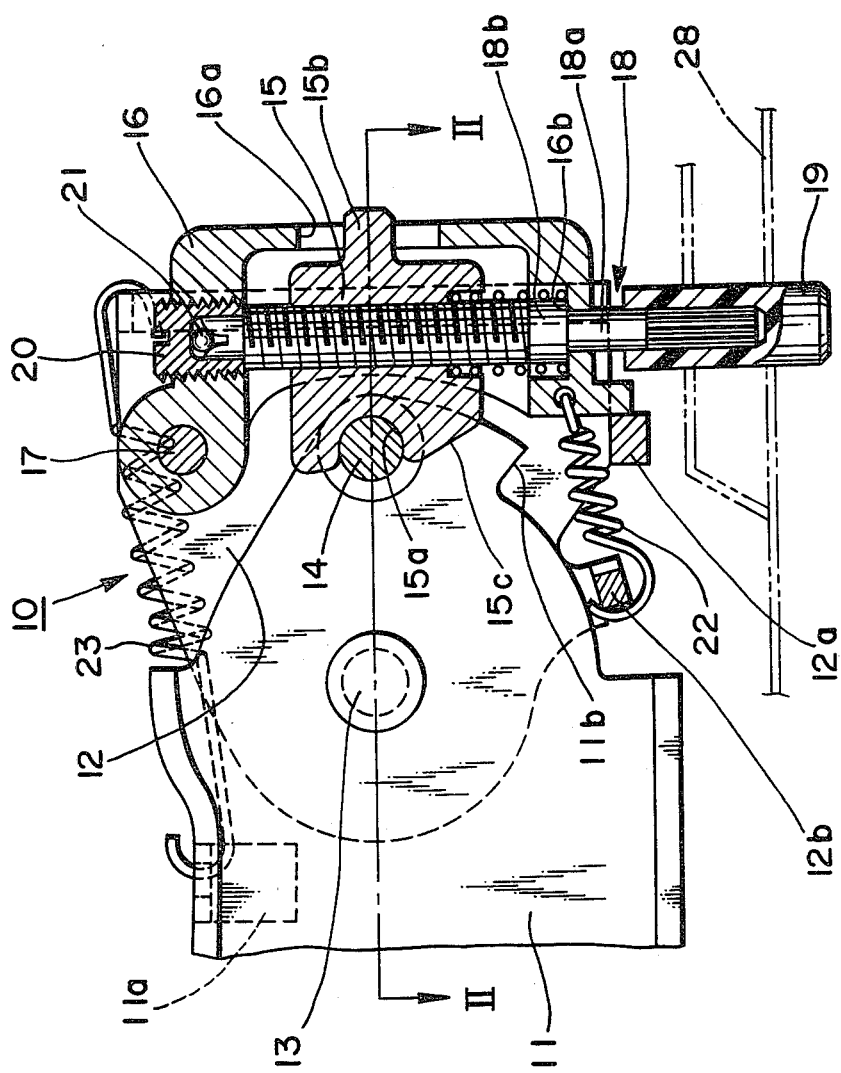

United States Patent [19]

Nishikawa

[11] 4,335,625
[45] Jun. 22, 1982

[54] TILTABLE STEERING SHAFT MECHANISM FOR AUTOMOBILES

[75] Inventor: Masumi Nishikawa, Toyoake, Japan

[73] Assignee: Aisin Seiki Kabushiki Kaisha, Kariya, Japan

[21] Appl. No.: 208,578

[22] Filed: Nov. 20, 1980

[30] Foreign Application Priority Data

Nov. 26, 1979 [JP] Japan ............................. 54-153101

[51] Int. Cl.³ .............................................. B62D 1/18
[52] U.S. Cl. ...................................... 74/493; 248/291; 403/93
[58] Field of Search .................... 74/493; 248/291; 280/775; 403/93

[56] References Cited

U.S. PATENT DOCUMENTS 3,355,962  12/1967  Gerdes et al. ..................... 74/493
3,851,543  12/1974  Krom ................................ 74/493
4,102,218   7/1978  Naka ................................ 74/493

Primary Examiner—Allan D. Herrmann

Attorney, Agent, or Firm—Finnegan, Henderson, Farabow

[57] ABSTRACT

A tiltable steering shaft mechanism for automobiles comprising a stationary steering bracket and a swingable steering bracket mounted on the stationary steering bracket for swinging movement about a transversely extending first horizontal axis. A lower steering shaft is carried by the stationary steering bracket and an upper steering shaft by the swingable steering bracket, the lower and upper steering shafts being connected together by a universal joint having a center on the first horizontal axis. A support bracket is mounted on the swingable steering bracket for pivotal movement about a transversely extending horizontal axis and carries a vertical adjusting rod which is rotatable about its own axis. The adjusting rod threadably engages an adjusting bracket which is linearly movable with respect to the support bracket and can be releasably engaged with the stationary bracket. The mechanism makes it possible to adjust the tilting angle of the upper steering shaft steplessly and to move the upper steering shaft to a tilt-away position when desired.

3 Claims, 2 Drawing Figures

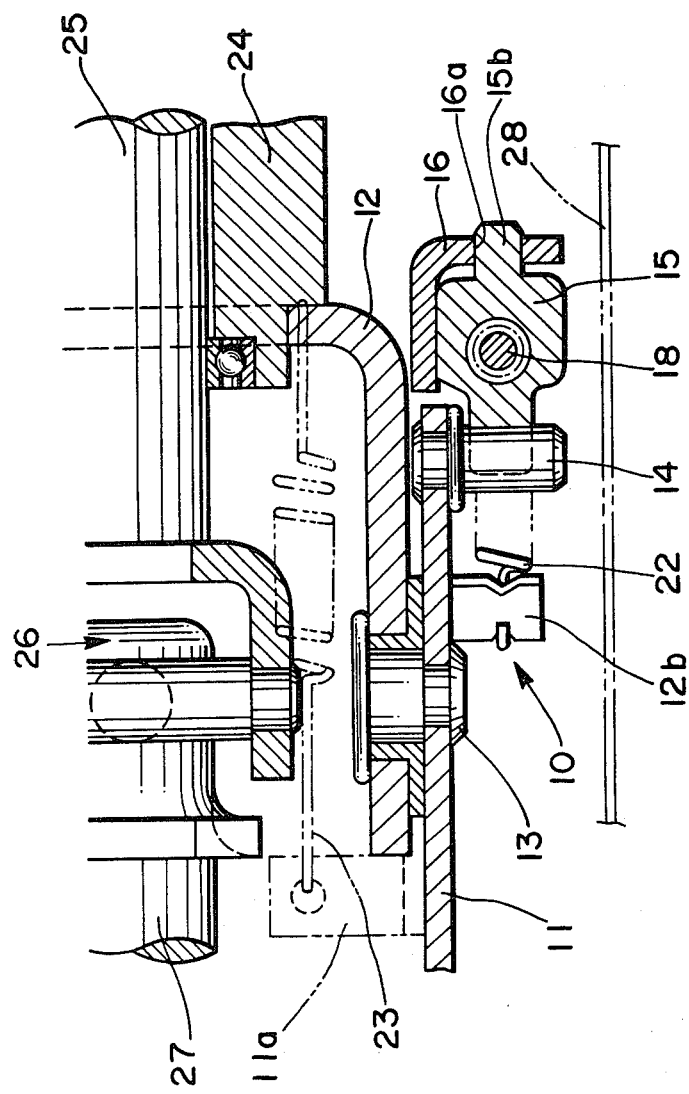

TILTABLE STEERING SHAFT MECHANISM FOR AUTOMOBILES

The present invention relates to automobile steering mechanisms and more particularly to tiltable steering shaft mechanisms therefor.

In automobile steering mechanisms, it has been known to provide steering shafts of variable tilting angles so that drivers can put steering wheels at desired positions. In this type of tiltable steering mechanisms, it has also been proposed to provide a tilt-away mechanism which makes it possible to shift the steering shaft quickly upwardly so that the driver can easily get into and out of the seat without being disturbed by the steering mechanism. In the known tiltable steering mechanism having the tilt-away mechanism, it has been required to make readjustment of the tilting angle of the steering shaft when the steering shaft is returned from the upwardly shifted position to the normal operative position.

It is therefore an object of the present invention to provide a tiltable steering shaft mechanism in which the tilting angle of the steering shaft can be steplessly changed and the tilting angle can be maintained even when the steering shaft is moved to the tilt-away position and then returned to the operative position.

According to the present invention, the above and other objects can be accomplished by a tiltable steering shaft mechanism which comprises stationary steering bracket means secured to a stationary part of an automobile, swingable steering bracket means mounted on the stationary steering bracket means for swinging movement about a first transversely extending horizontal axis, support bracket means mounted on the swingable steering bracket means for swinging movement about a second transversely extending horizontal axis, adjusting bracket means mounted on the support bracket means for movement in a direction substantially perpendicular to the horizontal axis, adjusting means for moving the adjusting bracket means with respect to the support bracket means, releasable engagement means between the stationary steering bracket means and the adjusting bracket means, first spring means for urging the adjusting bracket means into engagement with the stationary steering bracket means, second spring means for urging the swingable steering bracket means so that the swingable steering bracket means is swung upwardly about the first axis when the adjusting bracket means is released from the stationary steering bracket means, first steering shaft means carried by said swingable steering bracket means and having one end connected with second steering shaft means of invariable tilting angle through universal joint means having a center substantially on the first horizontal axis. According to the above arrangements, the tilting angle of the first steering shaft means can be changed as desired by operating the adjusting means so that the support bracket means is moved with respect to the adjusting bracket means. Since the adjusting bracket means is in engagement with the stationary steering bracket means, it is restricted from movement and the support bracket means is therefore moved to cause a swinging movement of the swingable steering bracket means. When it is desired to move the first steering shaft means to the tilt-away position, the support bracket means is moved about the second horizontal axis so that the adjusting bracket means is disengaged from the stationary steering bracket means against the action of the first spring means. The swingable steering bracket means is then swung under the action of the second spring means about the first horizontal axis to the tilt-away position. When the first steering shaft means is moved back to the normal operation position, the adjusting bracket means is again brought into engagement with the stationary steering bracket means under the action of the second spring means and the previous tilting angle can be maintained.

In a preferable mode of the present invention, the adjusting means is comprised of an adjusting rod which has an axis and is mounted on the support bracket means and threadably engaged with the adjusting bracket means so that a rotation of the rod causes a linear movement of the adjusting bracket means with respect to the support bracket means along the axis of the rod. The releasable engagement means may comprise engagement pin means provided on one of the stationary steering bracket means and the adjusting bracket means and recess means provided on the other.

The above and other objects and features of the present invention will become apparent from the following descriptions of a preferred embodiment taking reference to the accompanying drawings, in which:

FIG. 1 is a vertical section of the tiltable steering shaft mechanism in accordance with one embodiment of the present invention; and, FIG. 2 is a sectional view taken along the line II—II in FIG. 1.

Referring now to the drawings, there is shown a tiltable steering shaft mechanism 10 which includes a stationary steering bracket 11 which is securely mounted on a stationary part such as an instrument panel (not shown). On the bracket 11, there is mounted a swingable steering bracket 12 through transversely aligned pin 13 for swingable movement about the axis of the pin 13. The bracket 12 carries a support bracket 16 which is swingably mounted on the bracket 12 by means of a transverse pin 17.

An adjusting rod 18 is mounted on the support bracket 16 so as to extend in a direction perpendicular to the axis of the pins 13 and 17. The rod has a small diameter end portion 18a which extends downwardly through the support bracket 16 and is attached with an actuating knob 19. The other end of the rod 18 is received by a cap 20 and rotatably held thereby through a ball 21. The cap 20 has an external thread and is threaded into the support bracket 16. The rod 18 is formed near the small diameter end portion 18a with a large diameter land 18b which is adapted to be engaged with a seat surface 16b formed for the purpose on the support bracket 16.

In the intermediate position, the adjusting rod 18 is formed with an external thread for engagement with an internally threaded bore in an adjusting bracket 15. The adjusting bracket 15 is formed with a semi-circular recess 15a which is adapted for engagement with a pin 14 provided on the stationary steering bracket 11. The bracket 11 is also formed at a side opposite to the recess 15a with a lug 15b which is slidably engaged with a slot 16a formed in the support bracket 16. It will thus be understood that the support bracket 16 and the adjusting bracket 15 are movable with each other along the slot 16 but restricted from rotating with respect to each other. Since the adjusting bracket 15 is threadably engaged with the adjusting rod 18, the relative movement is produced between the adjusting bracket 15 and the support bracket 16. When the adjusting bracket 15 is in engagement with the stationary steering bracket 11 through the recess 15a and the pin 14, a rotation of the rod 18 causes a vertical movement of the support bracket 16 so that the swingable steering bracket 12 is vertically swung about the axis of the pin 13.

The swingable steering bracket 12 is formed with a transversely bent lug 12b where an end of a tension spring 22 is engaged. The other end of the spring 22 is held by the support bracket at the lower end portion thereof so that the support bracket 16 and the adjusting bracket 15 carried thereon are biased toward the stationary steering bracket 11 to thereby maintain the recess 15a in engagement with the pin 14. The swingable steering bracket 12 is further formed with a lug 12a which is adapted to engage with the lower portion of the support bracket 16 for limiting the movement of the support bracket 16 under the biasing force of the spring 22.

Between the stationary steering bracket 11 and the swingable steering bracket 12, there is a tension spring 23 which has one end engaged with a lug 11a on the stationary steering bracket 11 and the other end hooked to the upper portion of the swingable steering bracket 12. Thus, the spring 23 functions to bias the bracket 12 counterclockwise in FIG. 1 about the axis of the pin 13. It will therefore be understood that, when the support bracket 16 is moved counterclockwise about the pin 17 against the action of the spring 22 to disengage the adjusting bracket 15 from the stationary bracket 11, the swingable steering bracket 12 is swung under the action of the spring 23 counterclockwise about the axis of the pin 13. The stationary steering bracket 11 is formed with a stopping edge 11b which is adapted to engage with the lug 12b on the swingable steering bracket 12 for limiting the stroke of the swinging movement of the bracket 12.

As shown in FIG. 2, an upper steering shaft 25 is mounted on the swingable steering bracket 12. Although not shown in the drawings, the shaft 25 has a steering wheel at the upper or outer end thereof. The shaft 25 is carried on the swingable steering bracket 12 through bearing means 24 and has an inner or lower end connected with a lower steering shaft 27 through a universal joint 26 which may be of a conventional type. The lower steering shaft 27 is carried by the stationary steering bracket 11 with a fixed tilting angle. The universal joint 26 has a center which is on the axis of the pin 13.

In operation, the recess 15a on the adjusting bracket 15 is normally maintained under the action of the spring 22 in engagement with the pin 14 on the stationary steering bracket 11. Thus, the support bracket 16 and the swingable steering bracket 12 are held stationary by the adjusting bracket 16 through the actuating rod 18. In this position, the upper steering shaft 25 is maintained at a certain tilting angle which is determined by the position of the adjusting bracket 15 with respect to the adjusting rod 18.

When it is desired to change the tilting angle of the upper steering shaft 25, the driver may simply rotate the adjusting rod 18. Then, the rod 18 and the support bracket 16 are moved vertically upwards or downwards depending on the direction of rotation of the rod 18. The vertical movement is then transmitted through the pin 17 to the swingable steering bracket 12 to cause it to swing about the axis of the pin 13. Thus, the tilting angle of the upper steering shaft 18 is changed steplessly as desired.

In order to move the upper steering shaft 25 to a tilt-away position, the driver may move the lower end of the adjusting rod 18 toward right as seen in FIG. 1 against the action of the spring 22 until the recess 15a in the adjusting bracket 15 is disengaged from the pin 14 on the stationary steering bracket 11. Then, the swingable bracket 12 is swung upwardly under the action of the spring 23 about the axis of the pin 13 to move the upper steering shaft 25 to the upper or tilt-away position. The upper steering shaft 25 can be moved back to the normal operative position by simply moving it downwardly until the recess 15a of the adjusting bracket 15 is engaged with the pin 14 on the stationary steering bracket 11. In order that the recess 15a be brought into engagement with the pin 14 without fail, the adjusting bracket 15 is formed with a sloped guide surface 15c as shown in FIG. 1. Since the relative position between the adjusting bracket 15 and the adjusting rod 18 is maintained even when the upper steering shaft 25 is moved into and from the tilt-away position, the previously determined tilting angle of the shaft 25 is automatically established when the shaft 25 is moved back to the normal operative position.

The invention has thus been shown and described with reference to a specific embodiment, however, it should be noted that the invention is in no way limited to the details of the illustrated structures but changes and modifications may be made without departing from the scope of the appended claims.

I claim:

1. A tiltable steering shaft mechanism comprising steering bracket means secured to a stationary part of an automobile, swingable steering bracket means mounted on the stationary steering bracket means for swinging movement about a first transversely extending horizontal axis, support bracket means mounted on the swingable steering bracket means for swinging movement about a second transversely extending horizontal axis, adjusting bracket means mounted on the support bracket means for movement in a direction substantially perpendicular to the horizontal axis, adjusting means for moving the adjusting bracket means with respect to the support bracket means, releasable engagement means between the stationary steering bracket means and the adjusting bracket means, first spring means for urging the adjusting bracket means into engagement with the stationary steering bracket means, second spring means for urging the swingable steering bracket means so that the swingable steering bracket means is swung upwardly about the first axis when the adjusting bracket means is released from the stationary steering bracket means, first steering shaft means carried by said swingable steering bracket means and having one end connected with second steering shaft means of invariable tilting angle through universal joint means having a center substantially on the first horizontal axis.

2. A tiltable steering shaft mechanism in accordance with claim 1 in which said adjusting means is comprised of an adjusting rod which has an axis and is mounted on the support bracket means and threadably engaged with the adjusting bracket means so that a rotation of the rod causes a linear movement of the adjusting bracket means with respect to the support bracket means along the axis of the rod.

3. A tiltable steering shaft mechanism in accordance with claim 1 in which said releasable engagement means comprises engagement pin means provided on one of the stationary steering bracket means and the adjusting bracket means and recess means provided on the other.

* * * * *